US011327897B2

(12) United States Patent
Park et al.

(10) Patent No.: US 11,327,897 B2
(45) Date of Patent: May 10, 2022

(54) MEMORY CONTROLLER FOR PERFORMING A DUMMY READ OPERATION AND METHOD OF OPERATING THE SAME

(71) Applicant: SK hynix Inc., Gyeonggi-do (KR)

(72) Inventors: Kyung Sub Park, Gyeonggi-do (KR); Chi Wook An, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/924,827

(22) Filed: Jul. 9, 2020

(65) Prior Publication Data

US 2021/0216469 A1 Jul. 15, 2021

(30) Foreign Application Priority Data

Jan. 10, 2020 (KR) .................. 10-2020-0003726

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ............... G06F 12/1027; G06F 12/145; G06F 12/0246; G06F 12/10; G06F 12/1475; G06F 2212/65; G06F 3/0679
USPC .................................................. 711/103, 203
See application file for complete search history.

(56) References Cited

U.S. PATENT DOCUMENTS

| 2011/0157985 | A1* | 6/2011 | Sudo ....................... G11C 29/84 365/185.09 |
| 2019/0088342 | A1* | 3/2019 | Shimura ............ G11C 16/3459 |
| 2019/0171381 | A1* | 6/2019 | Ioannou ................ G06F 3/0604 |
| 2019/0348083 | A1* | 11/2019 | Pao ......................... G11C 16/22 |
| 2020/0202961 | A1* | 6/2020 | Chen .................. G11C 16/0483 |
| 2020/0341668 | A1* | 10/2020 | Gonczi ................. G06F 3/0688 |

FOREIGN PATENT DOCUMENTS

| KR | 10-2016-0047661 | 5/2016 |
| KR | 10-2019-0007928 | 1/2019 |

* cited by examiner

*Primary Examiner* — Michelle T Bechtold
*Assistant Examiner* — Edward Waddy, Jr.
(74) *Attorney, Agent, or Firm* — IP & T Group LLP

(57) ABSTRACT

The present technology relates to an electronic device. A memory controller instructs to perform a dummy read operation on a shared block after an operation is performed on a target block. The memory controller that controls a memory device including a plurality of memory blocks may include a flash translation layer that translates a logical block address received from a host into a physical block address and generates translation information on the translated physical block address and a dummy read controller configured to output, to the memory device, a dummy read command to perform a dummy read operation on a sharing block selected together with a target block after an operation corresponding to a request received from the host is performed on the target block among the plurality of memory blocks, based on the received request and the translation information.

14 Claims, 13 Drawing Sheets

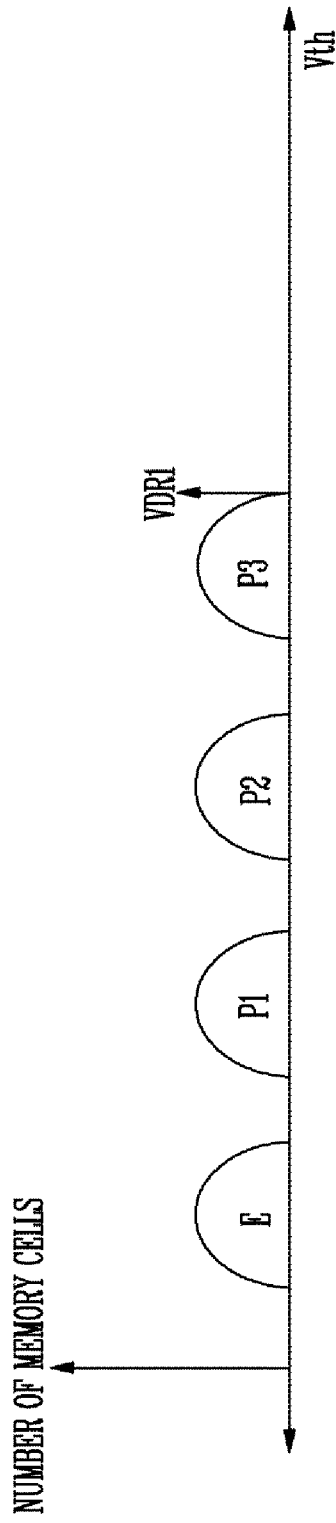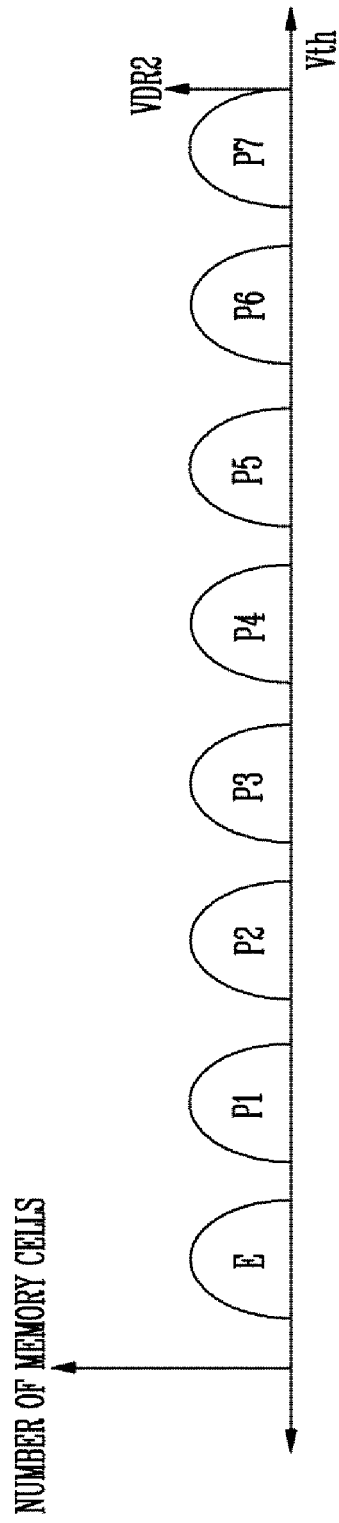

MEMORY CONTROLLER FOR PERFORMING A DUMMY READ OPERATION AND METHOD OF OPERATING THE SAME

CROSS-REFERENCE TO RELATED APPLICATION

The present application claims priority under 35 U.S.C. § 119(a) to Korean patent application number 10-2020-0003726, filed on Jan. 10, 2020, which is incorporated herein by reference in its entirety.

BACKGROUND

1. Field of Invention

The present disclosure relates to an electronic device, and more particularly, to a memory controller and a method of operating the same.

2. Description of Related Art

A storage device stores data under control of a host device such as a computer, a smart phone, or a smart pad. The storage device may be of a type that stores data in a magnetic disk such as a hard disk drive (HDD), or a type that stores data in a semiconductor memory such as a solid state drive (SSD), or a memory card, in particular, a non-volatile memory.

The storage device may include a memory device in which data is stored and a memory controller that stores data in the memory device. The memory device may be a volatile memory or a non-volatile memory. Here, examples of a non-volatile memory include a read only memory (ROM), a programmable ROM (PROM), an electrically programmable ROM (EPROM), an electrically erasable and programmable ROM (EPM), a flash memory, a phase-change RAM (PRAM), a magnetic RAM (MRAM), a resistive RAM (RRAM), a ferroelectric RAM (FRAM) and the like.

SUMMARY

An embodiment of the present disclosure provides a memory controller and a method of operating the same capable of performing a dummy read operation on a shared block before performing an operation on the shared block so as to prevent read fail for a first page of the shared block that occurs after a program, read, or erase operation is performed on a target block.

A memory controller according to an embodiment of the present disclosure controls a memory device including a plurality of memory blocks. The memory controller may include a flash translation layer that translates a logical block address received from a host into a physical block address and generates translation information on the translated physical block address and a dummy read controller configured to output, to the memory device, a dummy read command to perform a dummy read operation on a sharing block selected together with a target block after an operation corresponding to a request received from the host is performed on the target block among the plurality of memory blocks, based on the received request and the translation information.

A method of operating a memory controller according to an embodiment of the present disclosure is a method of operating a memory controller that controls a memory device including a plurality of memory blocks. The method may include receiving a request and a logical block address corresponding to the request from a host, outputting a command corresponding to the request received from the host and a physical block address obtained by translating the logical block address, generating translation information on the translated physical block address and outputting, to the memory device, a dummy read command for a sharing block selected together with a target block after an operation corresponding to the request received from the host is performed on the target block among the plurality of memory blocks, based on the received request and the translation information.

An embodiment of the disclosed technology may provide for an operating method of a controller. The operating method may include controlling a memory device to perform a target operation on a target block or on at least a set number of pages within the target block, the memory device including one or more planes each including blocks each including plural pages and controlling the memory device to perform, immediately after the target operation, a dummy read operation on at least one of the target block and one or more sharing blocks within the one or more planes, wherein the dummy read operation is performed with a read voltage level to turn on all of memory cells within the sharing blocks.

According to the present technology, after performing the program, read or erase operation is performed on the target block, the dummy read operation is performed on the shared block. Therefore, a channel of a string to which the memory cells included in the shared block are connected is initialized, and thus a first page read fail of the shared block may be prevented.

BRIEF DESCRIPTION OF THE DRAWINGS

FIGS. 8A and 8B are diagrams for describing a dummy read voltage corresponding to the dummy read command of FIG. 7.

DETAILED DESCRIPTION

Specific structural and functional description provided herein is directed to describing embodiments of the present invention. The present invention, however, may be configured or carried out differently than disclosed herein. Thus, the present invention is not limited to the disclosed embodiments. Throughout the specification, reference to "an embodiment," "another embodiment" or the like is not necessarily to only one embodiment, and different references to any such phrase are not necessarily to the same embodiment(s).

Hereinafter, embodiments of the present disclosure are described with reference to the accompanying drawings so that those skilled in the art may easily implement and practice the present invention.

Figure 1:
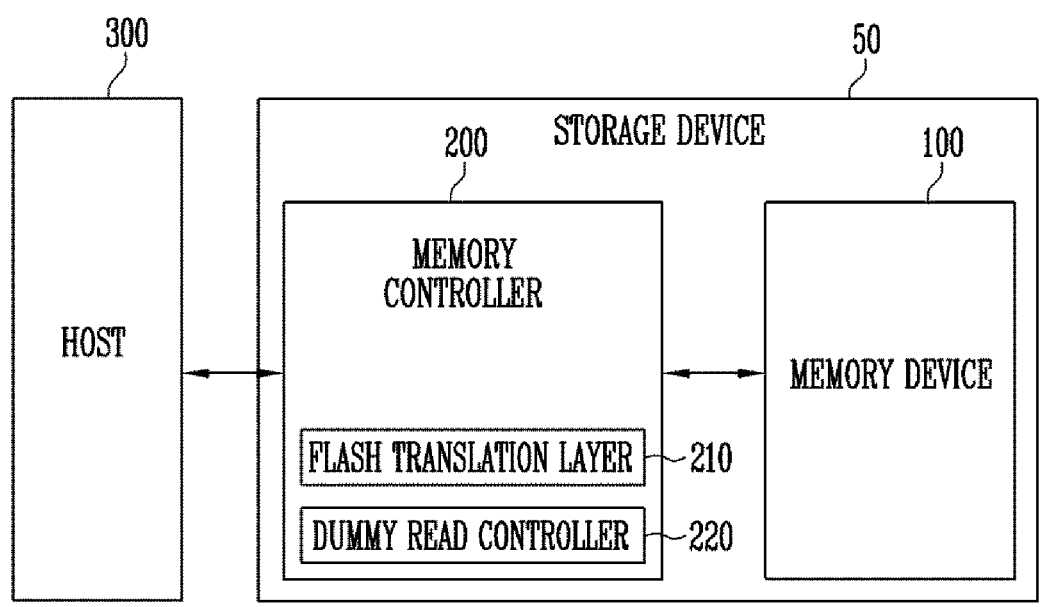
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 stores data under control of a host 300 such as a cellular phone, a smartphone, an MP3 player, a laptop computer, a desktop computer, a game player, a TV, a tablet PC, or an in-vehicle infotainment system.

The storage device 50 may be configured as any of various types of storage devices according to a host interface that is a communication method with the host 300. For example, the storage device 50 may be configured as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and/or a memory stick.

The storage device 50 may be manufactured as any of various types of packages. For example, the storage device 50 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory device 100 may store data. The memory device 100 operates in response to control of the memory controller 200. The memory device 100 may include a memory cell array including a plurality of memory cells storing the data. The memory cell array may include a plurality of memory blocks, each of which may include a plurality of memory cells, and the plurality of memory cells may configure a plurality of pages. In an embodiment, a page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, by way of example, features and aspects of the invention are described in the context in which the memory device 100 is a NAND flash memory.

The memory device 100 may be implemented as a two-dimensional array structure or a three-dimensional array structure. Hereinafter, the three-dimensional array structure is described as an embodiment, but the present invention is not limited to the three-dimensional array structure. The present invention may be applied not only to a flash memory device in which a charge storage layer is configured of a conductive floating gate (FG), but also to a charge trap flash (CTF) in which the charge storage layer is configured of an insulating film.

In an embodiment, the memory device 100 may operate in a single level cell (SLC) method in which one data bit is stored in one memory cell. Alternatively, the memory device 100 may operate in a method of storing at least two data bits in one memory cell. For example, the memory device 100 may operate in a multi-level cell (MLC) method of storing two data bits in one memory cell, a triple level cell (TLC) method of storing three data bits in one memory cell, or a quadruple level cell (QLC) method of storing four data bits in one memory cell.

The memory device 100 is configured to receive a command and an address from the memory controller 200 and access a region selected by the address in the memory cell array. That is, the memory device 100 may perform an operation corresponding to the command on the region selected by the address. For example, the memory device 100 may perform a write operation (program operation), a read operation, or an erase operation according to the received command. For example, when a program command is received, the memory device 100 may program data to the region selected by the address. When a read command is received, the memory device 100 may read data from the region selected by the address. When an erase command is received, the memory device 100 may erase data stored in the region selected by the address.

The memory controller 200 may control overall operation of the storage device 50.

When a power voltage is applied to the storage device 50, the memory controller 200 may execute firmware FW. When the memory device 100 is a flash memory device 100, the memory controller 200 may operate firmware such as a flash translation layer (FTL) for controlling communication between the host 300 and the memory device 100.

In an embodiment, the memory controller 200 may include firmware (not shown) that may receive data and a logical block address (LBA) from the host 300 and translate the LBA into a physical block address (PBA) indicating an address of memory cells in which data included in the memory device 100 is to be stored. In addition, the memory controller 200 may store a logical-physical address mapping table configuring a mapping relationship between the LBA and the PBA in a buffer memory.

The memory controller 200 may control the memory device 100 to perform the program operation, the read operation, the erase operation, or the like according to the request of the host 300. For example, when a program request is received from the host 300, the memory controller 200 may convert the program request into a program command, and may provide the program command, the PBA, and data to the memory device 100. When a read request is received from the host 300 together with the LBA, the memory controller 200 may change the read request into a read command, select a PBA corresponding to the LBA, and then provide the read command and the PBA to the memory device 100. When an erase request is received from the host 300 together with the LBA, the memory controller 200 may change the erase request into an erase command, select a PBA corresponding to the LBA, and then provide the erase command and the PBA to the memory device 100.

In an embodiment, the memory controller 200 may generate and transmit the program command, the address, and the data to the memory device 100 without a request from the host 300. For example, the memory controller 200 may provide a command, an address, and data to the memory device 100, without instruction from the host 300, so as to perform background operations such as a program operation for wear leveling and a program operation for garbage collection.

In an embodiment, the memory controller 200 may include a flash translation layer 210. The flash translation layer 210 may translate the LBA received from the host 300 into the PBA. The LBA may be received from the host 300 and may be received with a request. The flash translation layer 210 may configure a mapping relationship between the LBA and the PBA, and store the mapping relationship in the logical-physical address mapping table.

The flash translation layer 210 may generate and output translation information after translating the LBA into the PBA. The translation information may include information on whether the translated PBA indicates a memory block included in the memory device 100 or a page included in the memory device 100 and information on the number of translated pages. That is, the translation information may include information indicating whether the translated physical block address includes only a row address or includes a row address and a column address. In other words, the translation information may include information indicating whether the translated physical block address is an address of a memory block unit or an address of a page unit.

In an embodiment, the memory controller 200 may include a dummy read controller 220. The dummy read controller 220 may control a dummy read operation to be performed on a sharing block after a program operation or a read operation on a page included in a target block among a plurality of memory blocks included in the memory device 100 or an erase operation on the target block is performed. The target block may be a memory block to which a page on which an operation corresponding to a request received from the host 300 is to be performed belongs, or a memory block on which an operation corresponding to the request received from the host 300 is to be performed. The sharing block may be a memory block connected to the target block through a block word line. In this disclosure, the request may request a program operation or a read operation on a page in a target block or an erase operation on the target block. In this disclosure, the operation corresponding to the request may include a program operation or a read operation on a page in the target block or an erase operation on the target block.

For example, when the request received from the host 300 is a program request (or a read request) for a first page included in a first memory block included in the memory device 100, the first memory block may be the target block. Furthermore, after the program operation (or the read operation) on the first page included in the first memory block is performed, the dummy read controller 220 may control a dummy read operation to be performed on a second memory block connected to the first memory block through the block word lines.

In addition, for another example, when the request received from the host 300 is an erase request for the first memory block included in the memory device 100, the first memory block may be the target block. Furthermore, after the erase operation on the first memory block is performed, the dummy read controller 220 may control the dummy read operation to be performed on the second memory block connected to the first memory block through the block word lines.

The dummy read controller 220 may control a dummy read voltage level to be applied to the sharing block. The dummy read voltage level may be a level for turning on all memory cells included in the sharing block.

In addition, the dummy read controller 220 may determine a memory block on which the dummy read operation is to be performed. That is, when the memory device 100 is a single plane structure, the dummy read controller 220 may control the dummy read operation to be performed on only one sharing block. However, when the memory device 100 is a multi-plane structure, the dummy read controller 220 may control the dummy read operation to be performed on one sharing block and a memory block at the same position of another plane.

In an embodiment, the storage device 50 may further include a buffer memory (not shown). The memory controller 200 may control data exchange between the host 300 and the buffer memory (not shown). Alternatively, the memory controller 200 may temporarily store system data for controlling the memory device 100 in the buffer memory. For example, the memory controller 200 may temporarily store data input from the host 300 in the buffer memory, and then transmit data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In various embodiments, the buffer memory may be connected to the storage device 50 as an external device. In this case, one or more external volatile memory devices connected to the storage device 50 may serve as the buffer memory.

In an embodiment, the memory controller 200 may control two or more memory devices. In this case, the memory controller 200 may control the memory devices according to an interleaving method in order to improve operation performance.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and/or a load reduced DIMM (LRDIMM).

Figure 2:
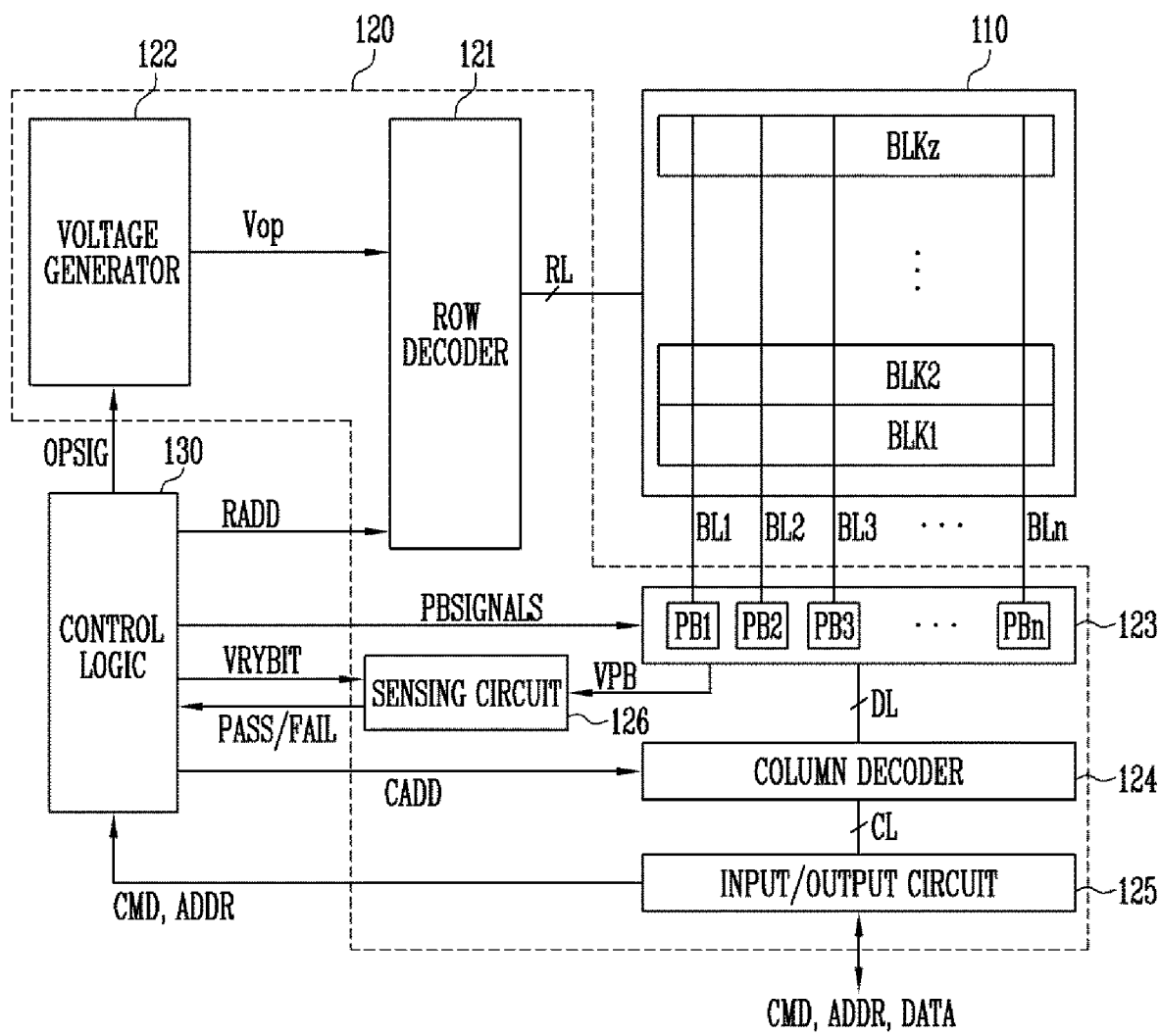
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz, which are connected to a row decoder 121 through row lines RL. The plurality of memory blocks BLK1 to BLKz may be connected to the page buffer group 123 through bit lines BL1 to BLn. Each of the plurality of memory blocks BLK1 to BLKz includes a plurality of memory cells. In an embodiment, the plurality of memory cells are non-volatile memory cells. Memory cells connected to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as a single level cell (SLC) that stores one data bit, a multi-level cell (MLC) that stores two data bits, a triple level cell (TLC) that stores three data bits, or a quadruple level cell (QLC) that stores four data bits.

The peripheral circuit 120 may be configured to perform the program operation, the read operation, or the erase operation on a selected region of the memory cell array 110 under control of the control logic 130. The peripheral circuit 120 may drive the memory cell array 110. For example, the peripheral circuit 120 may apply various operation voltages to the row lines RL and the bit lines BL1 to BLn or discharge the applied voltages under the control of the control logic 130.

The peripheral circuit 120 may include a row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 is configured to decode a row address RADD received from the control logic 130. The row decoder 121 selects at least one memory block among the memory blocks BLK1 to BLKz according to a decoded address. In addition, the row decoder 121 may select at least one word line of the memory block selected to apply the voltages generated by the voltage generator 122 to at least one word line WL according to the decoded address.

For example, during the program operation, the row decoder 121 may apply a program voltage to a selected word line and apply a program pass voltage of a level lower than the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage higher than the read voltage to the unselected word line.

In an embodiment, the erase operation of the memory device 100 is performed in a memory block unit. During the erase operation, the row decoder 121 may select one memory block according to the decoded address. During the erase operation, the row decoder 121 may apply a ground voltage to the word lines connected to the selected memory block.

The voltage generator 122 operates in response to the control of the control logic 130. The voltage generator 122 is configured to generate a plurality of voltages using an external power voltage supplied to the memory device 100. Specifically, the voltage generator 122 may generate various operation voltages Vop used for the program, read, and erase operations, in response to operation signal OPSIG. For example, the voltage generator 122 may generate the program voltage, the verify voltage, the pass voltage, the read voltage, the erase voltage, and the like in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage.

For example, the voltage generator 122 may include a plurality of pumping capacitors that receive the internal power voltage, and may selectively activate the plurality of pumping capacitors to generate the plurality of voltages, in response to the control of the control logic 130.

The generated plurality of voltages may be supplied to the memory cell array 110 by the row decoder 121.

The page buffer group 123 includes first to n-th page buffers PB1 to PBn connected to the memory cell array 110 through the first to n-th bit lines BL1 to BLn, respectively. The first to n-th page buffers PB1 to PBn operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

Specifically, during the program operation, when the program voltage is applied to the selected word line, the first to n-th page buffers PB1 to PBn may transfer data DATA received through the input/output circuit 125 to the selected memory cell through the first to n-th bit lines BL1 to BLn. The memory cells of the selected page are programmed according to the transferred data DATA. During the program verify operation, the first to n-th page buffers PB1 to PBn may read page data by sensing the voltage or the current received from the selected memory cells through the first to n-th bit lines BL1 to BLn.

During the read operation, the first to n-th page buffers PB1 to PBn read the data DATA from the memory cells of the selected page through the first to n-th bit lines BL1 to BLn, and outputs the read data DATA to the input/output circuit 125 under the control of the column decoder 124.

During the erase operation, the first to n-th page buffers PB1 to PBn may float the first to n-th bit lines BL1 to BLn or apply the erase voltage.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 of FIG. 1 to the control logic 130, or may exchange data DATA with the column decoder 124.

The sensing circuit 126 may generate a reference current in response to a permission bit signal VRYBIT during the read operation or the verify operation, and compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the permission bit VRYBIT in response to the command CMD and the address ADDR to control the peripheral circuit 120. For example, the control logic 130 may control the read operation of the selected memory block in response to a sub block read command and the address. In addition, the control logic 130 may control the erase operation of the selected sub block included in the selected memory block in response to the sub block erase command and the address. In addition, the control logic 130 may determine whether the verity operation has passed or failed in response to the pass or fail signal PASS or FAIL.

The memory cells included in the memory cell array 110 may be programmed to any one of a plurality of program states according to data stored in each memory cell. A target program state of the memory cell may be determined as any one of the plurality of program states according to data to be stored.

Figure 3:
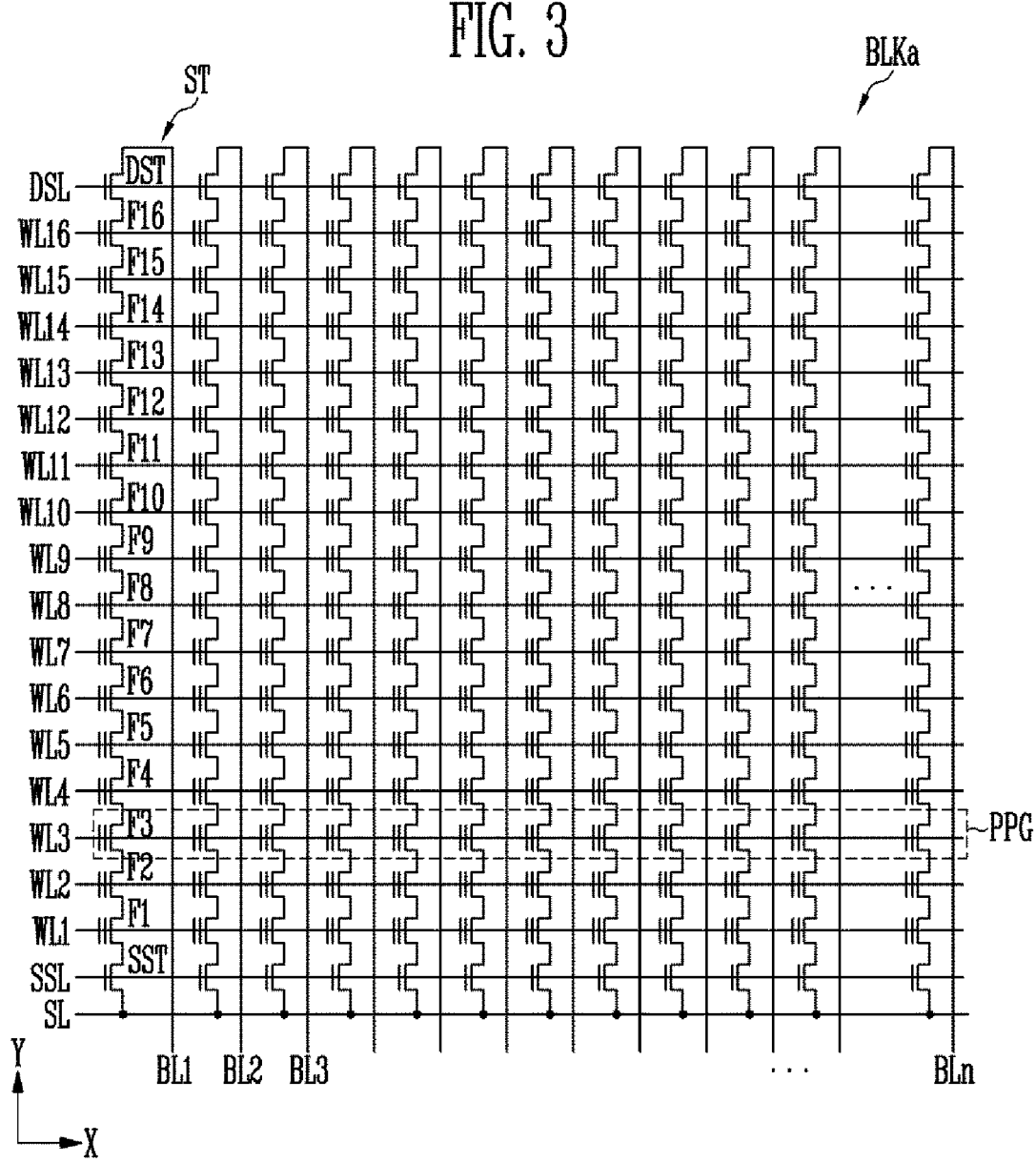
FIG. 3 is a diagram illustrating a memory block.

FIG. 3 is a diagram illustrating a memory block.

FIG. 3 is a circuit diagram showing a representative memory block BLKa among the plurality of memory blocks BLK1 to BLKz included in the memory cell array 110 of FIG. 2.

A first select line, word lines, and a second select line arranged in parallel with each other may be connected to the memory block BLKa. For example, the word lines may be arranged in parallel with each other between the first and second select lines. Here, the first select line may be the source select line SSL, and the second select line may be the drain select line DSL.

More specifically, the memory block BLKa may include a plurality of strings connected between the bit lines BL1 to BLn and a source line SL. The bit lines BL1 to BLn may be connected to the strings, respectively, and the source line SL may be commonly connected to the strings. Since the strings may be configured to be identical to each other, a string ST connected to the first bit line BL1 will be specifically described, as an example.

The string ST may include a source select transistor SST, a plurality of memory cells F1 to F16, and a drain select transistor DST connected in series between the source line SL and the first bit line BL1. One string ST may include one or more of the source select transistor SST and the drain select transistor DST, and may include more than the sixteen memory cells F1 to F16 shown in the drawing.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in the different strings may be connected to the source select line SSL, gates of the drain select transistors DST may be connected to the drain select line DSL, and gates of the memory cells F1 to F16 may be connected to a plurality of word lines WL1 to WL16. A group of the memory cells connected to the same word line among the memory cells included in different strings may be referred to as a physical page PPG. Therefore, the memory block BLKa may include the same number of physical pages PPG as there are word lines WL1 to WL16.

One memory cell may store one bit of data. This is commonly referred to as a single level cell (SLC). In this case, one physical page PPG may store one logical page (LPG) data. One logical page (LPG) data may include data bits of the number of memory cells included in one physical page PPG. In addition, one memory cell may store two or more bits of data. This is commonly referred to as a multi-level cell (MLC). In this case, one physical page PPG may store two or more logical page (LPG) data.

A memory cell in which two or more bits of data are stored in one memory cell is generally referred to as a multi-level cell (MLC), but recently, as the storage capacity of a memory cell has increased, MLC is used to refer to a memory cell in which two bits of data is stored, while a memory cell in which three or more bits of data are stored is referred to as a triple level cell (TLC) and a memory cell in which four or more bits of data are stored is referred to as a quadruple level cell (QLC). The present invention may be applied to the memory device 100 in which two or more bits of data are stored per memory cell.

In another embodiment, the memory block may have a three-dimensional structure. Each memory block includes a plurality of memory cells stacked on a substrate. Such plurality of memory cells are arranged along mutually orthogonal directions, e.g., a +X direction, a +Y direction, and a +Z direction.

Figure 4:
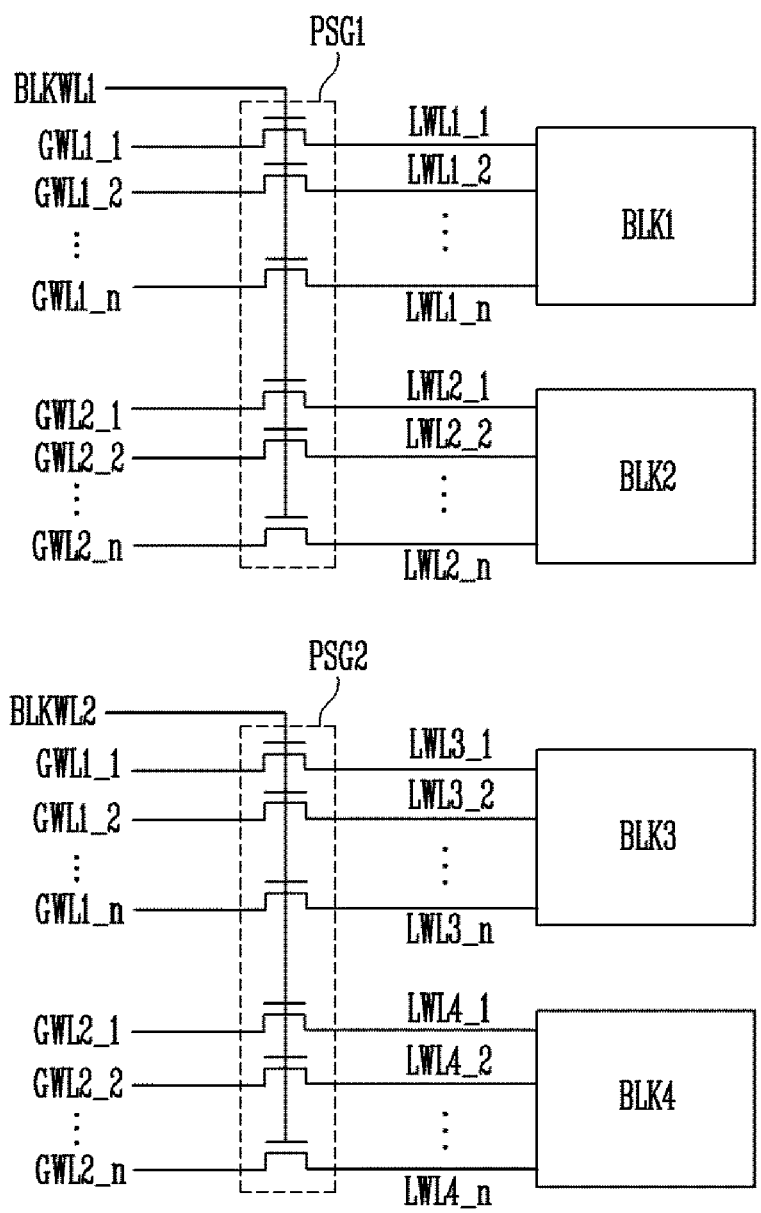
FIG. 4 is a diagram illustrating a target block, unselected memory blocks, and a sharing block.

FIG. 4 is a diagram for describing the target block, unselected memory blocks, and the sharing block.

FIG. 4 illustrates first to fourth memory blocks BLK1 to BLK4 among the plurality of memory blocks BLK1 to BLKz of FIG. 2. In FIG. 4, it is assumed that the memory device 100 of FIG. 2 is a single plane structure. The single plane of the memory device 100 of FIG. 4 may include the first to fourth memory blocks BLK1 to BLK4.

In an embodiment, the first memory block BLK1 may be connected to local word lines $LWL1\_1$ to $LWL1\_n$. That is, the plurality of memory cells included in the first memory block BLK1 may be connected to the local word lines $LWL1\_1$ to $LWL1\_n$.

Similarly, the second memory block BLK2 may be connected to local word lines $LWL2\_1$ to $LWL2\_n$, the third memory block BLK3 may be connected to local word lines $LWL3\_1$ to $LWL3\_n$, and the fourth memory block BLK4 may be connected to local word lines $LWL4\_1$ to $LWL4\_n$.

In an embodiment, global word lines $GWL1\_1$ to $GWL1\_n$ may be selectively connected to the first and third memory blocks BLK1 and BLK3 through first and second pass switch groups PSG1 and PSG2. The global word lines $GWL2\_1$ to $GWL2\_n$ may be selectively connected to the second and fourth memory blocks BLK2 and BLK4 through the first and second pass switch groups PSG1 and PSG2.

In an embodiment, the first pass switch group PSG1 may include a plurality of pass switches that are turned on or off in response to a voltage applied to a first block word line BLKWL1. The second pass switch group PSG1 may include a plurality of pass switches that are turned on or off in response to a voltage applied to a second block word line BLKWL2. Each pass switch may be formed by an NMOS transistor.

When a turn-on voltage is applied to the first and second block word lines BLKWL1 and BLKWL2 and the switches included in the first and second pass switch groups PSG1 and PSG2 are turned on, the global word lines GWL1_1 to GWL1_$n$ may be commonly connected to the first and third memory blocks BLK1 and BLK3, and the global word lines GWL2_1 to GWL2_$n$ may be commonly connected to the second and fourth memory blocks BLK2 and BLK4.

When the turn-on voltage is applied to the first block word line BLKWL1 and the turn-off voltage is applied to the second block word line BLKWL2, the pass switches in the first pass switch group PSG1 may be turned on and the pass switches in the second pass switch group PSG2 may be turned off. Therefore, the global word lines GWL1_1 to GWL1_$n$ are connected to the first memory block BLK1 and are not connected to the third memory block BLK3. In addition, the global word lines GWL2_1 to GWL2_$n$ are connected to the second memory block BLK2 and are not connected to the fourth memory block BLK4.

In contrast, when the turn-off voltage is applied to the first block word line BLKWL1 and the turn-on voltage is applied to the second block word line BLKWL2, the pass switches in the first pass switch group PSG1 may be turned off and the pass switches in the second pass switch group PSG2 may be turned on. Therefore, the global word lines GWL1_1 to GWL1_$n$ are connected to the third memory block BLK3 and are not connected to the first memory block BLK1. In addition, the global word lines GWL2_1 to GWL2_$n$ are connected to the fourth memory block BLK4 and are not connected to the second memory block BLK2.

As a result, memory block(s) may be selected based on the voltage applied to the block word line, and the operation voltage output from the voltage generator 122 of FIG. 2 may be transmitted to the selected memory block(s) through the global word lines and the pass switch group.

In an embodiment, an operation corresponding to the request received from the host 300 of FIG. 1 may be performed on the first memory block BLK1. In this case, the first memory block BLK1 may be the target block, and the remaining blocks, that is, the second to fourth memory blocks BLK2 to BLK4 may be the unselected memory blocks. The second memory block BLK2 connected to the first memory block BLK1 which is the target block through the first block word line BLKLK1 among the unselected memory blocks BLK2 to BLK4 may be the sharing block.

After (for example, preferably immediately after) the operation corresponding to the request is performed in the target block, a read operation may fail not only on the target block but also on the unselected memory block. Such fail is referred to as a "$1^{st}$ page read fail". Therefore, in the present disclosure, in order to prevent the "$1^{st}$ page read fail", a method of performing a dummy read operation on the sharing block is presented.

The content of performing the dummy read operation on the sharing block is described in detail below with reference to FIG. 7 and subsequent figures.

Figure 5:
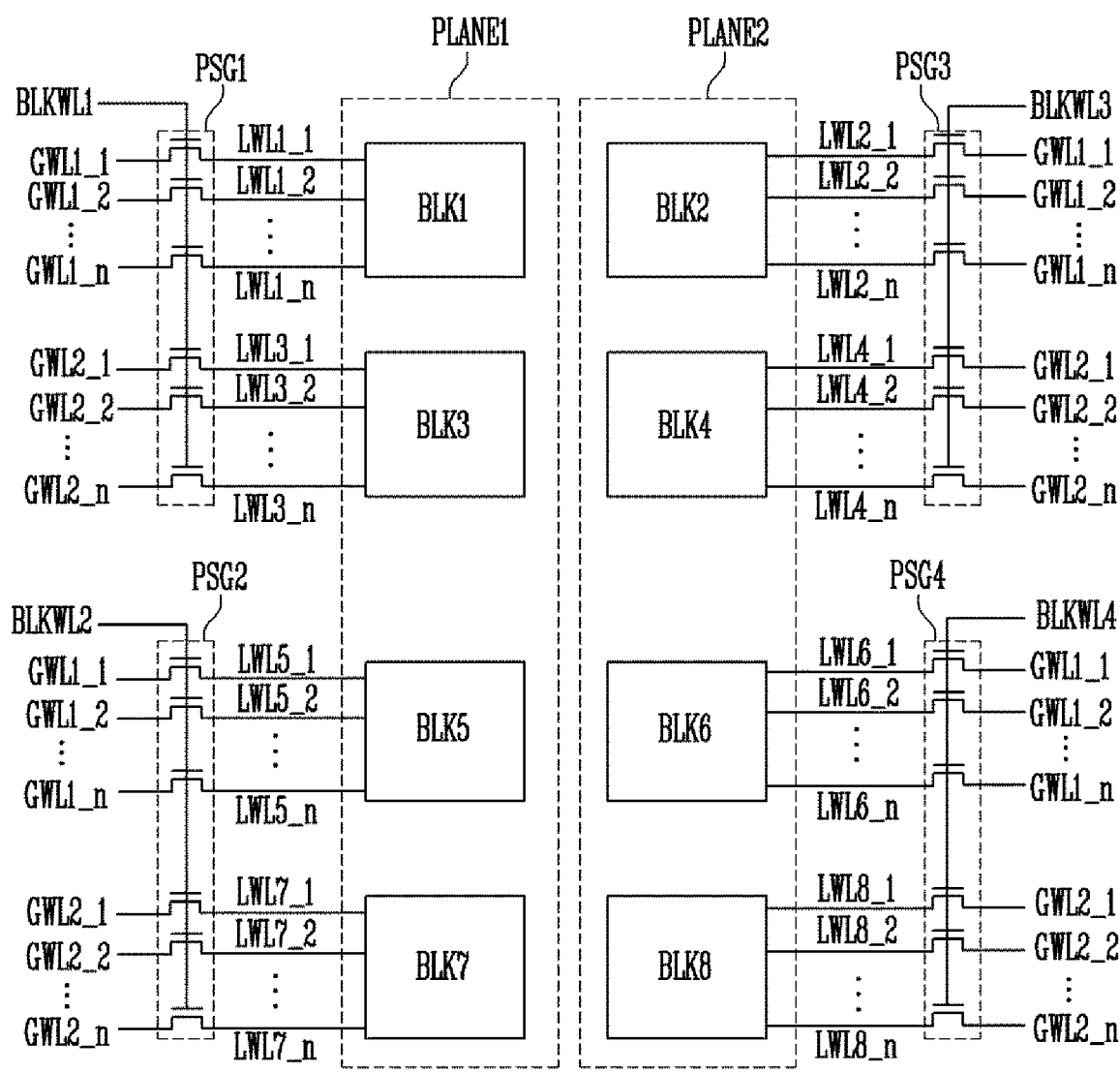
FIG. 5 is a diagram illustrating a target block, unselected memory blocks, and a sharing block in a multi-plane structure.

FIG. 5 is a diagram illustrating the target block, the unselected memory blocks, and the sharing block in a multi-plane structure.

Referring to FIG. 5, FIG. 5 illustrates memory blocks included in each of the multiple, e.g., two, planes when the memory device 100 of FIG. 2 has a multi-plane structure. While FIG. 5 illustrates that the memory device 100 of FIG. 2 includes two planes, PLANE1 and PLANE2, as an embodiment, the present invention is not limited to that configuration. More generally, the memory device 100 of FIG. 2 may include more than two planes.

In FIG. 5, the first plane PLANE1 includes first, third, fifth and seventh memory blocks BLK1, BLK3, BLK5, and BLK7, and the second plane PLANE2 includes second, fourth, sixth, and eighth memory blocks BLK2, BLK4, BLK6, and BLK8.

Except for its multi-plane structure, the memory device of FIG. 5 is the same as that of FIG. 4, and thus common features are not described again here.

In an embodiment, the first memory block BLK1 may be connected to local word lines LWL1_1 to LWL1_$n$, the second memory block BLK2 may be connected to local word lines LWL2_1 to LWL2_$n$, the third memory block BLK3 may be connected to local word lines LWL3_1 to LWL3_$n$, the fourth memory block BLK4 may be connected to local word lines LWL4_1 to LWL4_$n$, the fifth memory block BLK5 may be connected to local word lines LWL5_1 to LWL5_$n$, the sixth memory block BLK6 may be connected to local word lines LWL6_1 to LWL6_$n$, the seventh memory block BLK7 may be connected to local word lines LWL7_1 to LWL7_$n$, and the eighth memory block BLK8 may be connected to local word lines LWL8_1 to LWL8_$n$.

In an embodiment, the first, second, fifth, and sixth memory blocks BLK1, BLK2, BLK5, and BLK6 among the first to eighth memory blocks BLK1 to BLK8 may be connected to the global word lines GWL1_1 to GWL1_$n$, and the third, fourth, seventh, and eighth memory blocks BLK3, BLK4, BLK7, and BLK8 may be connected to the global word lines GWL2_1 to GWL2_$n$.

Each of the global word lines GWL1_1 to GWL1_$n$ and the global word lines GWL2_1 to GWL2_$n$ may be selectively connected to the first to eighth memory blocks BLK1 to BLK8 through first to fourth pass switch groups PSG1 to PSG4.

Therefore, when the turn-on voltage is applied to the first block word line BLKWL1, voltages applied to the global word lines GWL1_1 to GWL1_$n$ and the global word lines GWL2_1 to GWL2_$n$ may be applied to the first and third memory blocks BLK1 and BLK3, respectively. When the turn-on voltage is applied to the second block word line BLKWL2, the voltages applied to the global word lines GWL1_1 to GWL1_$n$ and the global word lines GWL2_1 to GWL2_$n$ may be applied to the fifth and seventh memory blocks BLK5 and BLK7, respectively.

In addition, when the turn-on voltage is applied to the third block word line BLKWL3, the voltages applied to the global word lines GWL1_1 to GWL1_$n$ and the global word lines GWL2_1 to GWL2_$n$ may be applied to the second and fourth memory blocks BLK2 and BLK4, respectively. When the turn-on voltage is applied to the fourth block word line BLKWL4, the voltages applied to the global word lines GWL1_1 to GWL1_$n$ and the global word lines GWL2_1 to GWL2_$n$ may be applied to the sixth and eighth memory blocks BLK6 and BLK8, respectively.

As a result, identically to FIG. 4, the memory block may be selected based on the voltage applied to the block word line, and the operation voltage output from the voltage generator 122 of FIG. 2 may be transmitted to the selected memory block through the global word lines and the pass switch group.

In FIG. 5, the operation corresponding to the request received from the host 300 of FIG. 1 may be performed on the first memory block BLK1. In this case, the first memory block BLK1 may be the target block, and the remaining blocks, that is, the second to eighth memory blocks BLK2 to BLK8, may be the unselected memory blocks. Among the unselected memory blocks BLK2 to BLK8, the third memory block BLK3 connected to the first memory block BLK1, which is the target block, through the first block word line BLKLK1 may be the sharing block.

In an embodiment, the operation corresponding to the request received from the host 300 of FIG. 1 may be performed on the first memory block BLK1. In this case, the first memory block BLK1 may be the target block, and the remaining blocks, that is, the second to eighth memory blocks BLK2 to BLK8 may be the unselected memory blocks. Among the unselected memory blocks BLK2 to BLK8, the first memory block BLK1, which is the target block, and the third memory block BLK3 connected through the first block word line BLKLK1 may be the sharing blocks.

In the present disclosure, when the memory device 100 of FIG. 2 has a multi-plane structure, the dummy read operation may be performed on not only the third memory block BLK3 but also the fourth memory block BLK4 that is the memory block of the same position as the third memory block BLK3 among the memory blocks included in another plane. That is, the sharing blocks of the first memory block BLK1 may be the third and fourth memory blocks BLK3 and BLK4 having the same offset within different planes of the multi-plane structure. In this case, the read command received from the memory controller 200 of FIG. 1 may be a multi-plane read command.

Figure 6:
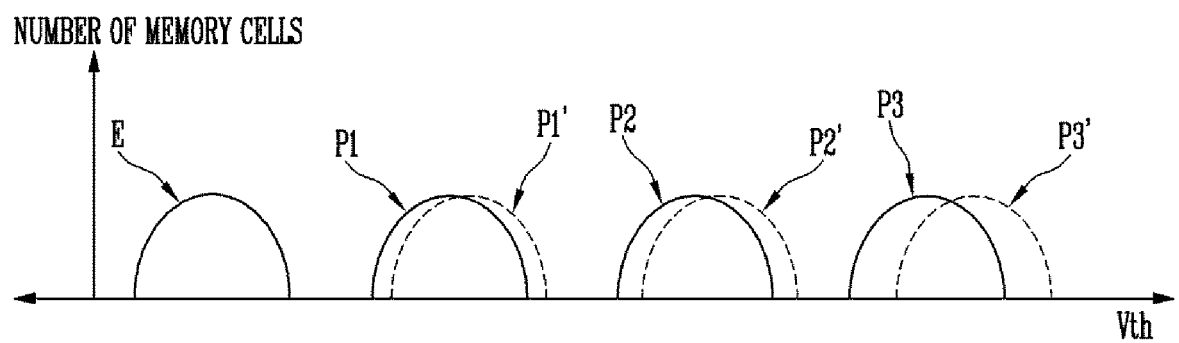
FIG. 6 is a diagram for describing a process in which a $1^{st}$ page read fail occurs.

FIG. 6 is a diagram for describing a process in which a "1$^{st}$ page read fail" occurs.

FIG. 6 illustrates a threshold voltage distribution of the memory cells included in the memory block after the program operation is performed on a target memory block among the memory blocks of FIGS. 4 and 5. In FIG. 6, it is assumed that the memory cells included in the memory device 100 of FIG. 2 are programmed in a multi-level cell (MLC) method. That is, the memory cells may be in one of an erase state E and first to third program states P1 to P3.

In another embodiment, the memory cells included in the memory device 100 of FIG. 2 may be programmed in a single level cell (SLC) method, a triple level cell (TLC) method, or a quadruple level cell (QLC) method. That is, the present invention extends to other program methods for cells of various storage capacities.

In an embodiment, the operation corresponding to the request received from the host 300 (shown in FIG. 1) may be performed on the target block. For example, when the request received from the host 300 is the program request, the program operation may be performed on the target block including a page to be programmed.

When the program operation is performed, a voltage may be applied to a plurality of word lines and bit lines connected to each of the plurality of memory blocks included in the memory device 100 (of FIG. 2) in a program step and a verify step. In addition, a channel of the memory cells may be initialized between the program step and the verify step.

Therefore, during the program operation, an unintentional hole may flow in or may be leaked through a string to which the plurality of memory blocks are connected.

In an embodiment, since the voltage may be applied to the plurality of word lines and bit lines connected to each of the plurality of memory blocks not only in the program operation but also in the read operation or the erase operation, the unintentional hole may flow in or may be leaked through the string to which the plurality of memory blocks are connected.

FIG. 6 illustrates a case where the unintentional hole is introduced into the memory blocks. That is, when the hole flows in, a potential of the string to which the memory cells are connected may be increased, and as the string potential is increased, a current flowing through the string may be reduced. Therefore, a threshold voltage of the memory cells may be increased.

In an embodiment, as the hole flows in the memory blocks, the first program state P1 may be changed to a first program state P1', the second program state P2 may be changed to a second program state P2', and the third program state P3 may be changed to a third 'program state P3'. That is, the threshold voltage distribution of the memory cells may be shifted to the right, as shown in FIG. 6.

In an embodiment, when the unintended hole is leaked out of the memory blocks, the threshold voltage distribution of the memory cells may be shifted to the left (not shown). That is, when the hole is leaked, the potential of the string to which the memory cells are connected is reduced, and as the string potential is reduced, the current flowing through the string may be increased. Therefore, the threshold voltage of the memory cells may be reduced.

As a result, when the program operation, the read operation, or the erase operation is performed on the target block, the threshold voltage distribution of the target block and sharing blocks may be changed. In addition, due to the changed threshold voltage distribution, the read operation may fail during the read operation on the target block and sharing blocks. That is, data read by the read operation performed on the target block and sharing blocks immediately after the operation on the target block is performed may include a relatively large number of bits that could not be read, i.e., fail bits. This is referred to as "1$^{st}$ page read fail".

However, data read by the read operation on the target block and sharing blocks performed after the "1$^{st}$ page read fail" may include a relatively small number of fail bits. Therefore, in the present disclosure, in order to prevent a "1$^{st}$ page read fail" on the target block and sharing blocks, a method of performing the dummy read operation on the sharing block after performing the operation on the target block and before performing a subsequent operation on the sharing block is presented.

Figure 7:
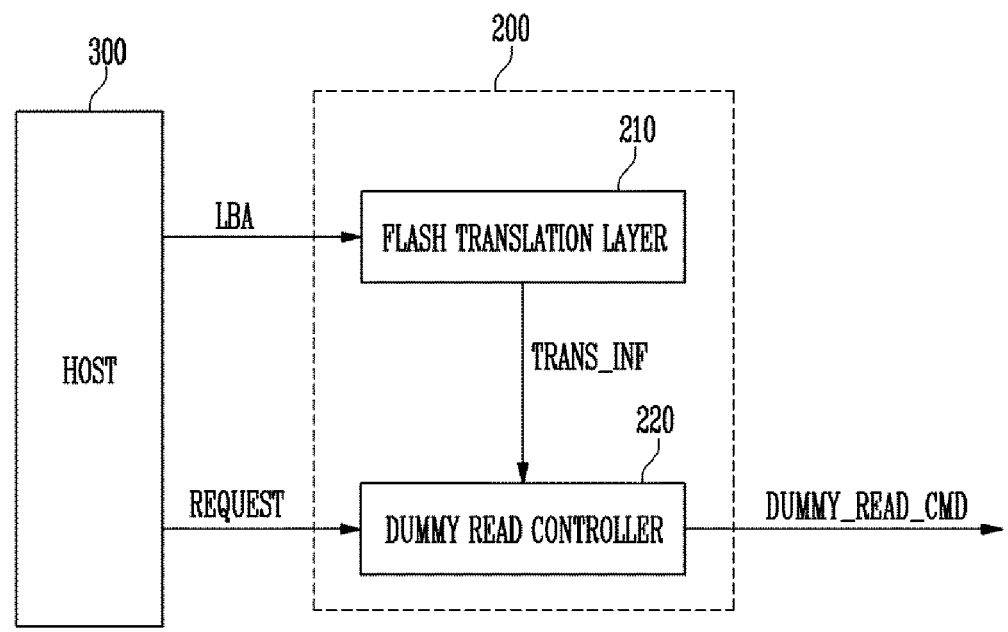
FIG. 7 is a diagram illustrating a configuration of a memory controller of FIG. 1 for outputting a dummy read command based on a request output from a host and a logical block address.

FIG. 7 is a diagram illustrating a configuration of the memory controller of FIG. 1 for outputting the dummy read command based on the request output from the host and the logical block address.

Referring to FIG. 7, the memory controller 200 may include a flash translation layer 210 and a dummy read controller 220.

In an embodiment, the flash translation layer 210 may receive a logical block address (LBA) from the host 300 and translate the LBA into a physical block address (PBA). The LBA may be received together with a request (REQUEST) from the host 300 and may be an address corresponding to the request. The flash translation layer 210 may form a mapping relationship between the LBA and the PBA, and store the mapping relationship in a logical-physical address mapping table.

The flash translation layer 210 may generate translation information (TRANS_INF) when translating the LBA into the PBA. The translation information may include information on whether the translated PBA is an address corresponding to a page of the memory device 100 or an address corresponding to a memory block of the memory device 100. That is, the translation information may include information indicating whether the translated PBA includes only a row address or includes a row address and a column address. In other words, the translation information may include information indicating whether the translated PBA is an address of a memory block unit or an address of a page unit.

In addition, the translation information may include information on the number of pages indicated by the translated address.

For example, when the request received from the host 300 is an erase request, the PBA corresponding to the LBA received together with the erase request is may be an address indicating a specific memory block of the memory device 100 of FIG. 2. In this case, the translated PBA may include only the row address, and not the column address.

Therefore, the flash translation layer 210 may translate the LBA received together with the erase request into the PBA, and may generate the translation information indicating that the translated address is the address of the specific memory block of the memory device 100.

For another example, when the request received from the host 300 is a program request or a read request, the PBA corresponding to the LBA received together with the program request or the read request may be an address indicating a specific page of the memory device 100. In this case, the translated PBA may include both the column address and the row address.

Therefore, the flash translation layer 210 may translate the LBA received together with the program request or the read request into the PBA, and may generate the translation information indicating that the translated address is the address of the specific page of the memory device 100 and the number of translated addresses.

As a result, when the request received from the host 300 is an erase request, the flash translation layer 210 may generate the translation information indicating that the LBA is translated to the address of the specific memory block. In addition, when the request received from the host 300 is a program request or a read request, the flash translation layer 210 may generate information indicating that the LBA is translated to the address of the specific page and the transformation information on the number of corresponding pages.

In an embodiment, the dummy read controller 220 may receive the request from the host 300. The request received from the host 300 may be a program request, a read request, or a erase request. In addition, the dummy read controller 220 may receive the transformation information from the flash translation layer 210.

The dummy read controller 220 may generate a dummy read command (DUMMY_READ_CMD) based on the request received from the host 300 and/or the transformation information.

Specifically, the dummy read controller 220 may generate the dummy read command when the translated address is the address indicating the specific memory block or the number of translated pages exceeds a reference value, which may be preset. Furthermore, when the request received from the host 300 is a erase request, since the erase request is performed in a memory block unit, the dummy read controller 220 may generate the dummy read command based on the erase request or the transformation information.

In an embodiment, when the request received from the host 300 is a erase request, the dummy read controller 220 may generate the dummy read command based on the erase request received from the host 300 and/or the transformation information. In an embodiment, when the request received from the host 300 is a program request or a read request, the dummy read controller 220 may generate the dummy read command based on the program request or the read request received from the host 300 and the transformation information.

Specifically, when the request received from the host 300 is an erase request, since the PBA translated by the flash translation layer 210 is the address indicating the specific memory block of the memory device 100, the dummy read controller 220 may generate the dummy read command instructing performing the dummy read operation on the sharing block and output the dummy read command to the memory device 100.

However, since an erase operation corresponding to a erase request is performed in a memory block unit, when receiving the erase request regardless of the transformation information or when receiving the transformation information indicating translation into the address of the specific memory block, the dummy read controller 220 may generate the dummy read command instructing performing the dummy read operation on the sharing block. The dummy read controller 220 may output the generated dummy read command to the memory device 100.

In addition, when the request received from the host 300 is a program request or an erase request, since the PBA translated by the flash translation layer 210 is the address indicating the specific page of the memory device 100, the dummy read controller 220 may generate the dummy read command instructing performing the dummy read operation on the sharing block based on the translation information. That is, when receiving a program request or an erase request from the host 300, the flash translation layer 210 may generate the dummy read command based on the number of pages corresponding to the translated address and output the dummy read command to the memory device 100.

In an embodiment, when the memory device 100 has a multi-plane structure, the dummy read controller 220 may generate the dummy read command for performing the dummy read operation on each plane. That is, the dummy read command generated for a multi-plane memory device 100 may be a multi-plane read command. In this case, the multi-plane memory device 100 may perform the dummy read operation not only on the sharing block but also on the memory block of the same position as the sharing block among the memory blocks included in another plane.

In an embodiment, the dummy read controller 220 may determine the number of pages on which the dummy read operation is to be performed and the read voltage used during the dummy read operation. For example, the dummy read controller 220 may determine to perform the dummy read operation on some or all of pages included in the sharing block. In addition, during the dummy read operation, the dummy read controller 220 may control a read voltage level to be applied to word lines to which each page is connected.

The read voltage level controlled by the dummy read controller 220 is described in more detail with reference to FIG. 8.

FIGS. 8A and 8B are diagrams for describing a dummy read voltage corresponding to the dummy read command of FIG. 7.

Referring to FIGS. 8A and 8B, FIG. 8A illustrates the threshold voltage distribution of the memory cells when the memory device 100 performs the program operation in in multi-level cells (MLCs), i.e., by an MLC method. FIG. 8B illustrates the threshold voltage distribution of the memory cells when the memory device 100 performs the program operation in triple level cells (TLCs), i.e., by a TLC method.

In an embodiment, when the dummy read controller 220 generates the dummy read command based on the erase request received from the host 300 and/or the transformation information, the dummy read controller 220 may determine the dummy read voltage level to be used for the dummy read operation.

In an embodiment, the dummy read operation corresponding to the dummy read command may be an operation for preventing the "$1^{st}$ page read fail" after the operation is performed on the target block. Therefore, in order to prevent the "$1^{st}$ page read fail", all memory cells included in the sharing block are required to be turned on. That is, since all memory cells included in the sharing block are turned on and then turned off, the threshold voltage distribution of the memory cells may become normal.

Therefore, the dummy read controller 220 may control the dummy read voltage to be used for the dummy read operation according to a program method of the memory device 100 of FIG. 2.

Referring to FIG. 8A, FIG. 8A illustrates the threshold voltage distribution of the memory cells when the memory device 100 performs the program operation in a multi-level cell (MLC) method. Therefore, when the dummy read controller 220 determines to perform the dummy read operation on the sharing block, the dummy read controller 220 may determine to perform the dummy read operation with a first dummy read voltage VDR1 higher than that of a third program state P3 in order to turn on all memory cells included in the sharing block.

Referring to FIG. 8B, FIG. 8B illustrates the threshold voltage distribution of the memory cells when the memory device 100 performs the program operation in a triple level cell (TLC) method. Therefore, when the dummy read controller 220 determines to perform the dummy read operation on the sharing block, the dummy read controller 220 may determine to perform the dummy read operation with a second dummy read voltage VDR2 higher than that of a seventh program state P7 in order to turn on all memory cells included in the sharing block.

In another embodiment, when the memory device 100 performs the program operation in a single level cell (SLC) method, a voltage higher than that of a first program state may be determined as the dummy read voltage, and when the memory device 100 performs the program operation in a quadruple level cell (QLC) method, a voltage higher than that of a fifteenth program state may be determined as the dummy read voltage.

Figure 9:
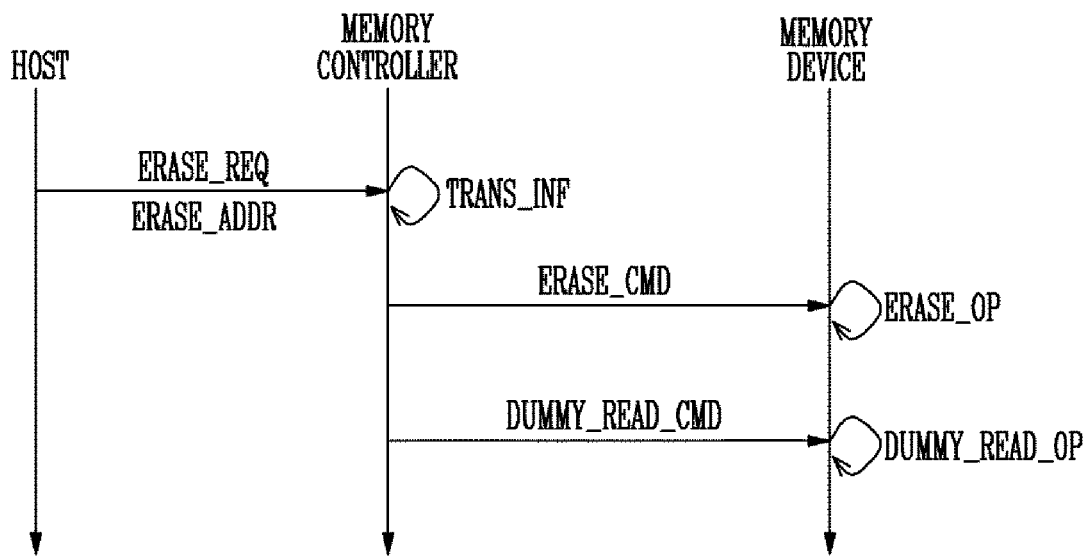
FIG. 9 is a diagram for describing a process of performing a dummy read operation when the request output from the host is an erase request.

FIG. 9 is a diagram for describing a process of performing the dummy read operation when the request output from the host is the erase request.

Referring to FIG. 9, FIG. 9 illustrates a process of performing the dummy read operation on the sharing block when the memory device 100 (MEMORY DEVICE) performs the erase operation on the target block.

In an embodiment, the memory controller 200 (MEMORY CONTROLLER) may receive an erase request ERASE_REQ and an erase address (ERASE_ADDR) corresponding to the erase request (ERASE_REQ) from the host 300 (HOST). The erase address may be the logical block address LBA.

The memory controller may translate the erase address received from the host to a physical block address (PBA). The translated PBA may be an address of the target block on which the erase operation (ERASE_OP) is performed.

Thereafter, the memory controller may output the translated PBA to the memory device together with an erase command corresponding to the erase request. The memory device may perform an erase operation in response to the erase command.

In an embodiment, when the erase address received from the host is translated into the PBA, translation information may be generated. The translation information may include information indicating that the translated address is an address of a specific memory block among a plurality of memory blocks included in the memory device.

Since the erase operation is performed in the memory block unit, when the erase command is output to the memory device or when the translation information indicating that the translated address is an address related to the specific memory block of the memory device is generated, the memory controller may generate the dummy read command.

That is, when the memory controller checks that the operation is performed in the memory block unit on the memory device, the memory controller may determine to perform the dummy read operation on the sharing block connected to the target block through the block word line on which the operation is performed.

Thereafter, when the memory controller generates the dummy read command and outputs the dummy read command to the memory device, the memory device may perform a dummy read operation corresponding to the dummy read command. When the memory device is the single plane structure, the dummy read operation may be performed on the sharing block. In an embodiment, when the memory device has a multi-plane structure, the dummy read operation may be performed on the sharing block or may be performed on the sharing block and the memory block of the same position as the sharing block among the memory blocks of another plane.

Figure 10:
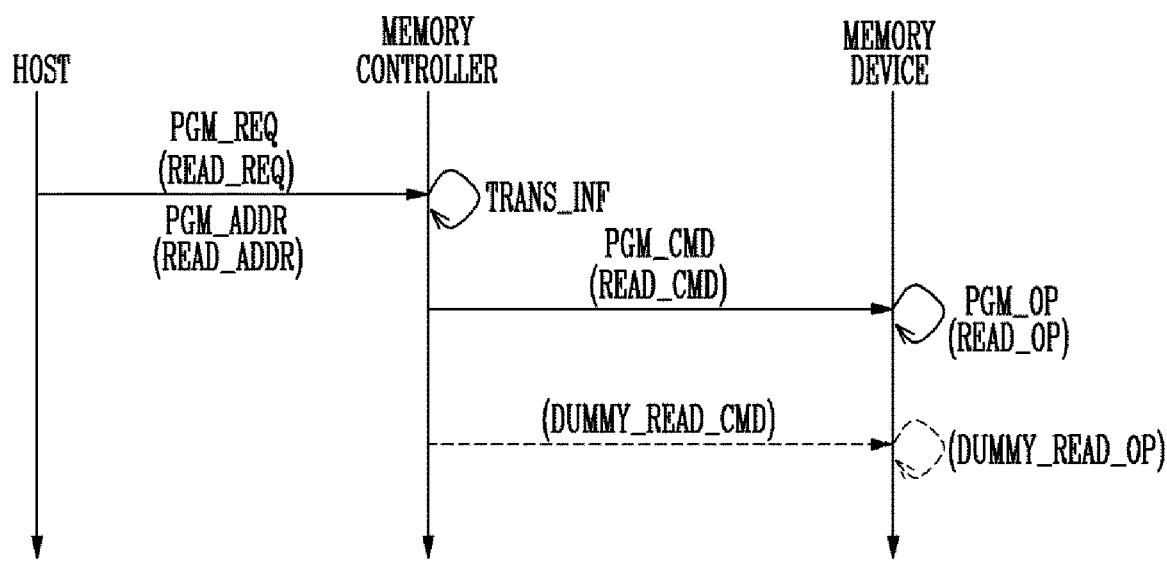
FIG. 10 is a diagram for describing a process of performing the dummy read operation when the request output from the host is a program request or a read request.

FIG. 10 is a diagram for describing a process of performing the dummy read operation when the request output from the host is a program request or a read request.

Referring to FIG. 10, FIG. 10 illustrates a process of performing the dummy read operation on the sharing block when the memory device 100 (MEMORY DEVICE) performs the program operation or the erase operation on the target block.

In an embodiment, the memory controller 200 (MEMORY CONTROLLER) may receive a program address (PGM_ADDR) corresponding to a program request (PGM_REQ) together with the program request or receive a read address (READ_ADDR) corresponding to a read request (READ_REQ) together with the read request from the host 300 (HOST). The program address (PGM_ADDR) or the read address (READ_ADDR) may be the logical block address (LBA).

The memory controller may translate the program address or the read address received from the host into the physical block address PBA. The translated PBA may be an address of the target block including the page on which a program operation (PGM_OP) or a read operation (READ_OP) is performed.

Thereafter, the memory controller may output the translated PBA to the memory device together with a program command (PGM_CMD) or a read command (READ_CMD) corresponding to the program request or the read request. The memory device may perform the program operation or the read operation in response to the program command or the read command.

In an embodiment, when the program address or the read address received from the host is translated into the PBA, the translation information may be generated. The translation information may include information indicating that the translated address is an address related to a specific page among pages included in the memory device. Additionally, the translation information may also include information on the number of pages corresponding to the translated address.

Since the program operation or the read operation is performed in the page unit, the memory controller may generate the dummy read command based on the translation information.

For example, when the number of pages corresponding to the translated address included in the translation information exceeds a reference value, the memory controller may generate the dummy read command. On the contrary, when the number of pages corresponding to the translated address included in the translation information is equal to or less than the reference value, the memory controller may not generate the dummy read command.

Thereafter, when the memory controller generates the dummy read command and outputs the dummy read command to the memory device, the memory device may perform the dummy read operation corresponding to the dummy read command. When the memory device is the single plane structure, the dummy read operation may be performed on the sharing block. In an embodiment, when the memory device has a multi-plane structure, the dummy read operation may be performed on the sharing block or may be performed on the sharing block and the memory block of the same position as the sharing block among the memory blocks of another plane.

Figure 11:
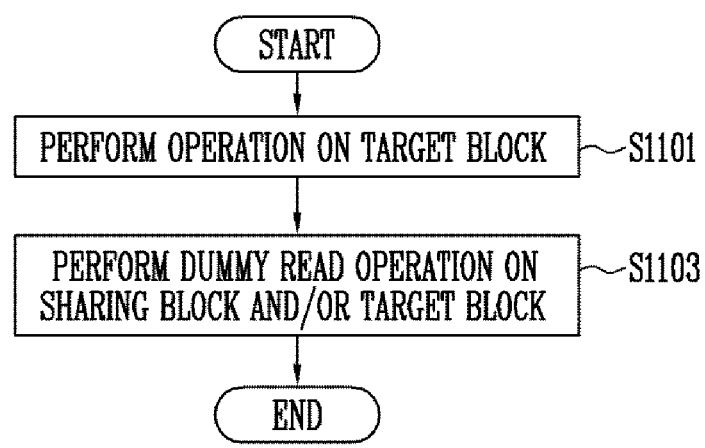
FIG. 11 is a diagram for describing an operation of the memory device according to an embodiment of the present disclosure.

FIG. 11 is a diagram for describing an operation of the memory device according to an embodiment of the present disclosure.

Referring to FIG. 11, in step S1101, the memory device may perform the operation on the target block. For example, the operation may be performed on the target block corresponding to a request received from the host. That is, when a program request or read request is received from the host, the operation corresponding thereto may be performed on a page in the target block to which such request is directed, and when an erase request is received from the host, a corresponding erase request may be performed on the target block.

Once the operation corresponding to the request of the host is performed on the target block, in step S1103, the memory device may perform the dummy read operation on the sharing block and/or the target block.

When the operation corresponding to the request is performed on the target block, a "1$^{st}$ page read fail" may occur not only on the target block but also on the unselected memory block. Therefore, in the present disclosure, after the operation is performed on the target block, the dummy read operation may be performed on the sharing block and/or the target block. Moreover, in an embodiment the dummy read operation is preferably performed immediately or very soon after the request corresponding operation is performed.

Figure 12:
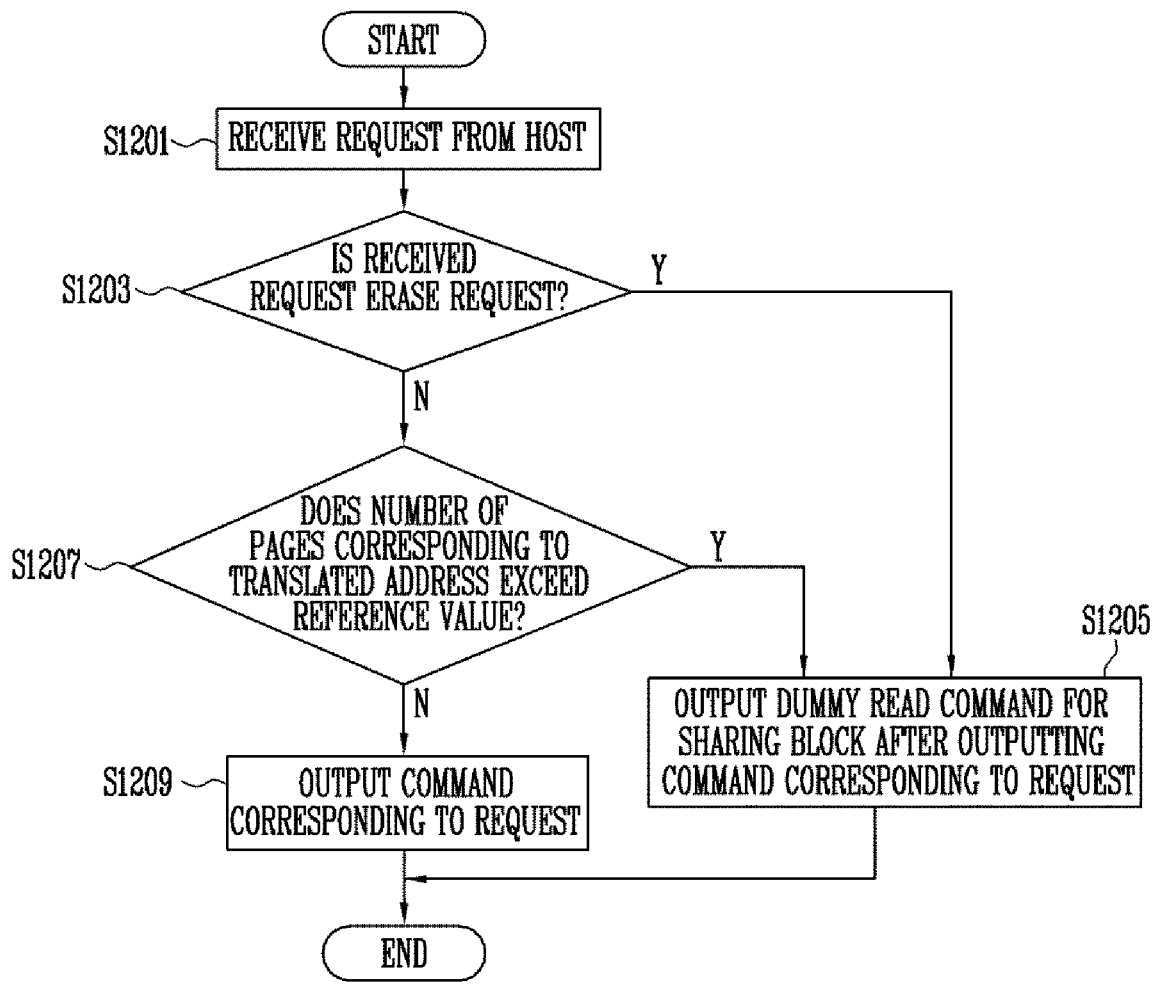
FIG. 12 is a diagram for describing an operation of the memory controller according to an embodiment of the present disclosure.

FIG. 12 is a diagram for describing an operation of the memory controller according to an embodiment of the present disclosure.

Referring to FIG. 12, in step S1201, the memory controller may receive a request from the host. The request received from the host may be a program request, a read request, or an erase request.

When receiving the request from the host, the memory controller may determine whether the received request is a erase request (S1203). When the request received from the host is a erase request (Y at S1203), the memory controller may output a command corresponding to the request, that is, the erase command to the memory device, and then may output the dummy read command to perform the dummy read operation on the sharing block (S1205). The memory block on which the erase request is performed may be the target block, and the memory block connected to the target block through the block word line may be the sharing block.

In an embodiment, since the erase operation corresponding to the erase command is performed on an entire memory block, i.e., in the memory block unit, the dummy read operation may be performed on the sharing block regardless of the number of pages corresponding to the translated address. Therefore, when the erase command is output to the memory device, or when the translation information indicating that the translated address is an address related to a specific memory block of the memory device is generated, the memory controller may generate the dummy read command and output the dummy read command to the memory device.

When the request received from the host is not a erase request (N at S1203), that is, when the request received from the host is a program request or a read request, the memory controller may determine whether the number of pages corresponding to the translated address exceeds a reference value (S1207). The reference value may be set in advance.

When the number of pages corresponding to the translated address exceeds the reference value (Y at S1207), the process proceeds to step S1205. The memory controller may output the dummy read command for performing the dummy read operation on the sharing block after outputting the program command or the read command corresponding to the program request or the read request.

However, when the number of pages corresponding to the translated address does not exceed the reference value (N at S1207), the memory controller may output a command corresponding to the request (S1209). That is, the memory controller may not output the dummy read command after outputting the program command or the read command corresponding to the program request or the read request.

Figure 13:
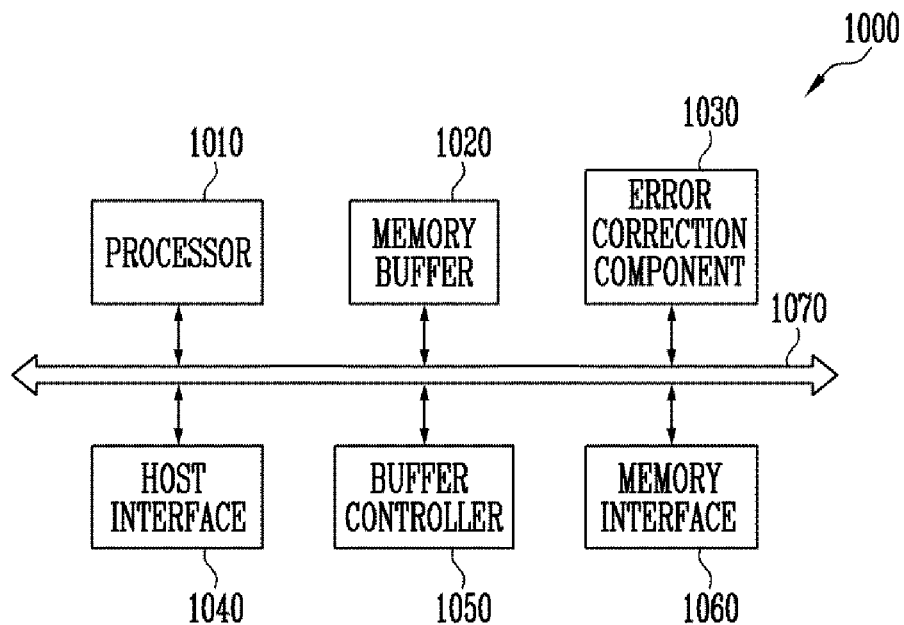
FIG. 13 is a diagram illustrating another embodiment of the memory controller of FIG. 1.

FIG. 13 is a diagram illustrating another embodiment of the memory controller of FIG. 1.

The memory controller 1000 is connected to a host and the memory device. The memory controller 1000 is configured to access the memory device in response to a request from the host. For example, the memory controller 1000 is configured to control write, read, erase, and background operations of the memory device. The memory controller 1000 is configured to provide an interface between the memory device and the host. The memory controller 1000 is configured to drive firmware for controlling the memory device.

Referring to FIG. 13, the memory controller 1000 may include a processor 1010, a memory buffer 1020, an error correction component (ECC) 1030, a host interface 1040, a buffer controller (or buffer control circuit) 1050, a memory interface 1060, and a bus 1070.

The bus 1070 may be configured to provide a channel between components of the memory controller 1000.

The processor 1010 may control overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of the FTL. The processor 1010 may translate the LBA provided by the host into the PBA through the FTL. The FTL may receive the LBA by using a mapping table and translate the LBA into the PBA. An address mapping method of the flash translation layer include a plurality of mapping methods according to a mapping unit. A representative address mapping method includes a page mapping method, a block mapping method, and a hybrid mapping method.

In an embodiment, the processor 1010 may output the dummy read command for the sharing block based on the request received from the host 300 of FIG. 1 and/or the translated physical block address (PBA). The sharing block may be a memory block connected to the target block on which the operation corresponding to the request is performed through the block word line.

For example, when the request received from the host 300 of FIG. 1 is the erase request, the processor 1010 may output the dummy read command for the sharing block, when the erase request is received, or when the translated PBA includes only a row address indicating the memory block. That is, when the translated PBA is an address of the memory block unit, the processor 1010 may output the dummy read command for the sharing block.

In addition, when the request received from the host 300 of FIG. 1 is a program request or a read request, the processor 1010 may output the dummy read command for the sharing block, when the number of pages corresponding to the translated PBA exceeds a reference value, which may be determined in advance.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction component 1030 may perform error correction. The error correction component 1030 may perform error correction encoding (ECC encoding) based on data to be written to the memory device through memory interface 1060. The error correction encoded data may be transferred to the memory device through the memory interface 1060. The error correction component 1030 may perform error correction decoding (ECC decoding) on the data received from the memory device through the memory interface 1060. For example, the error correction component 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and/or a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other so as not to interfere with, or affect, each other. The data bus may be connected to the host interface 1040, the buffer controller 1050, the error correction component 1030, and the memory interface 1060. The control bus may be connected to the host interface 1040, the processor 1010, the buffer controller 1050, the memory buffer 1202, and the memory interface 1060.

Figure 14:
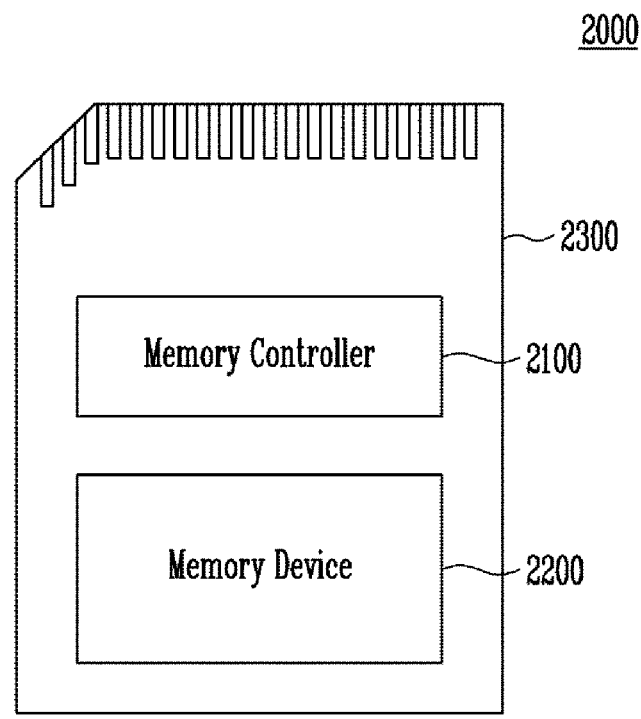
FIG. 14 is a block diagram illustrating a memory card system to which the storage device is applied according to an embodiment of the present disclosure.

FIG. 14 is a block diagram illustrating a memory card system to which the storage device is applied according to an embodiment of the present disclosure.

Referring to FIG. 14, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and the host. The memory controller 2100 is configured to drive firmware for controlling the memory device 2200. The memory device 2200 may be implemented by the memory device 100 described with reference to FIG. 2.

As an example, the memory controller 2100 may include components such as a random access memory (RAM), a processor, a host interface, a memory interface, and an error correction component.

The memory controller 2100 may communicate with an external device through the connector 2300. The memory controller 2100 may communicate with an external device (for example, the host) according to a specific communication standard. As an example, the memory controller 2100 is configured to communicate with an external device through at least one of various communication standards such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and/or an NVMe. As an example, the connector 2300 may be defined by at least one of the various communication standards described above.

As an example, the memory device 2200 may be implemented as any of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin-torque magnetic RAM (STT-MRAM).

In an embodiment, the memory controller 2100 may output the dummy read command for the sharing block among the memory blocks included in the memory device 2200, based on the request received from the host 300 of FIG. 1 and/or the translated physical block address (PBA). The sharing block may be a memory block connected to the target block on which the operation corresponding to the request is performed through the block word line.

For example, when the request received from the host 300 of FIG. 1 is the erase request, the processor 1010 may output the dummy read command for the sharing block, when the erase request is received, or when the translated PBA includes only a row address indicating the memory block. That is, when the translated PBA is an address of the memory block unit, the processor 1010 may output the dummy read command for the sharing block.

In addition, when the request received from the host 300 of FIG. 1 is a program request or a read request, the processor 1010 may output the dummy read command for the sharing block, when the number of pages corresponding to the translated PBA exceeds a reference value.

The memory controller 2100 and the memory device 2200 may be integrated into one semiconductor device to configure a memory card, such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), and/or a universal flash storage (UFS).

Figure 15:
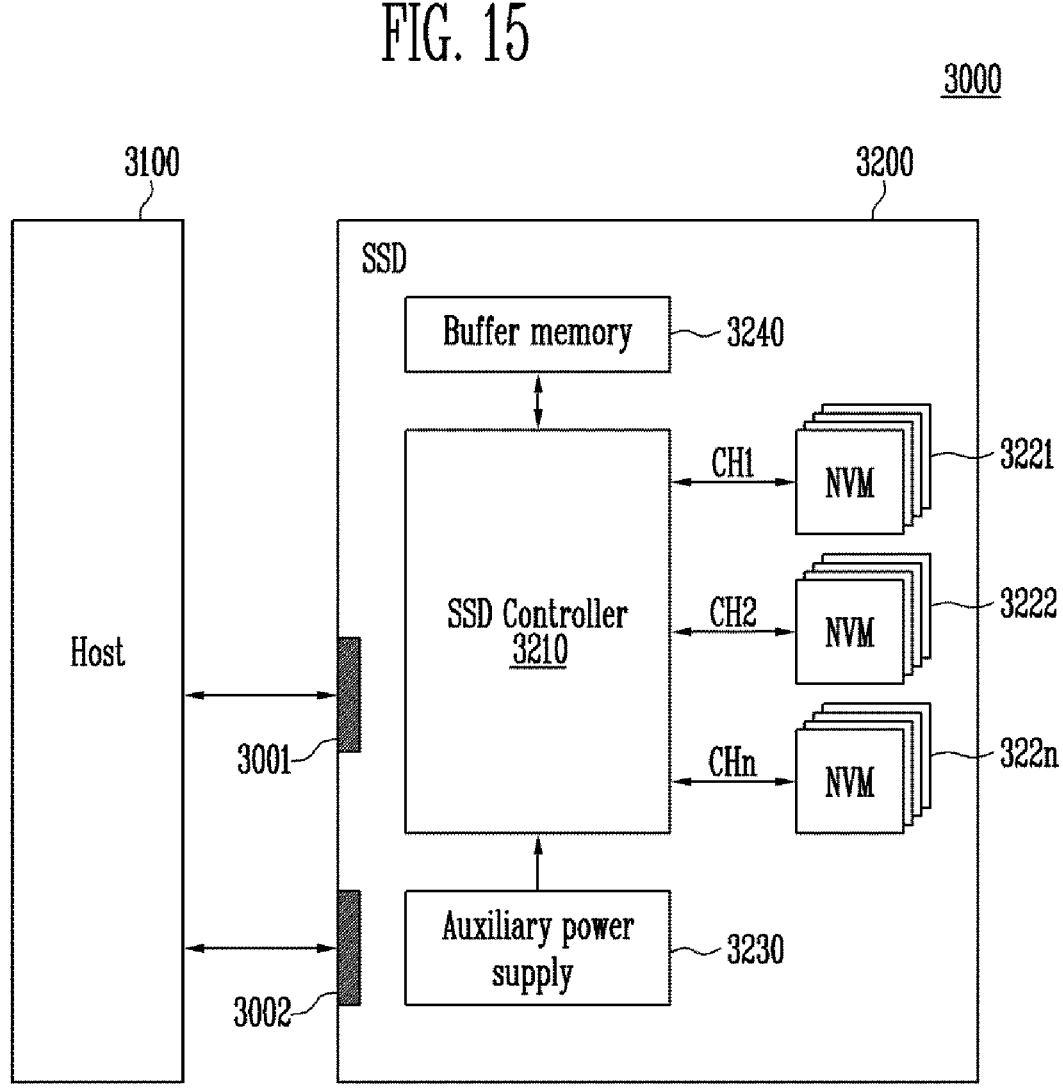
FIG. 15 is a block diagram illustrating a solid state drive (SSD) system to which the storage device is applied according to an embodiment of the present disclosure.

FIG. 15 is a block diagram illustrating a solid state drive (SSD) system to which the storage device is applied according to an embodiment of the present disclosure.

Referring to FIG. 15, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform the function of the memory controller 200 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of interfaces such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and/or an NVMe.

In an embodiment, the SSD controller 2100 may output the dummy read command for the sharing block among the memory blocks included in the plurality of memory blocks 3221 to 322n, based on the request received from the host 3100 and/or the translated physical block address (PBA). The sharing block may be a memory block connected to the target block on which the operation corresponding to the request is performed through the block word line.

For example, when the request received from the host 3100 is the erase request, the SSD controller 3210 may output the dummy read command for the sharing block, when the erase request is received, or when the translated PBA includes only a row address indicating the memory block. That is, when the translated PBA is an address of the memory block unit, the SSD controller 3210 may output the dummy read command for the sharing block.

In addition, when the request received from the host 3100 is the program request or the read request, the SSD controller 3210 may output the dummy read command for the sharing block, when the number of pages corresponding to the translated PBA exceeds a reference value.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be disposed in the SSD 3200 or may be external to the SSD 3200. For example, the auxiliary power device 3230 may be disposed on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and/or a PRAM.

Figure 16:
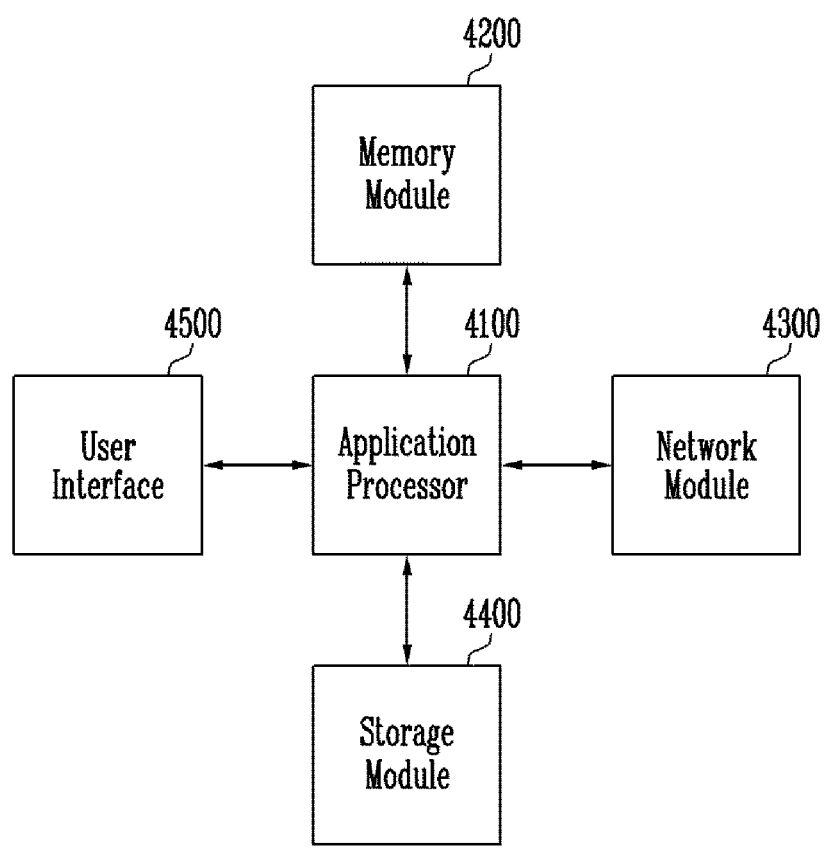
FIG. 16 is a block diagram illustrating a user system to which the storage device is applied according to an embodiment of the present disclosure.

FIG. 16 is a block diagram illustrating a user system to which the storage device is applied according to an embodiment of the present disclosure.

Referring to FIG. 16, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

In an embodiment, the application processor 4100 may output the dummy read command for the sharing block among the memory blocks included in the storage module 4400, based on the request received from the host 300 of FIG. 1 and/or the translated physical block address (PBA). The sharing block may be a memory block connected to the target block on which the operation corresponding to the request is performed through the block word line.

For example, when the request received from the host 300 of FIG. 1 is the erase request, the application processor 4100 may output the dummy read command for the sharing block, when the erase request is received, or when the translated PBA includes only a row address indicating the memory block. That is, when the translated PBA is an address of the memory block unit, the application processor 4100 may output the dummy read command for the sharing block.

In addition, when the request received from the host 300 of FIG. 1 is the program request or the read request, the application processor 4100 may output the dummy read command for the sharing block, when the number of pages corresponding to the translated PBA exceeds a reference value.

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and/or an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and/or a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device described with reference to FIGS. 2 and 3. The storage module may operate identically to the storage module 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

While various embodiments of the present invention have been illustrated and described, those skilled in the art will understand from the present disclosure that various modifications may be made without departing from the spirit and scope of the present invention. Thus, the present invention encompasses all modifications and variations of any of the disclosed embodiments that fall within the scope of the claims.

What is claimed is:

1. A memory controller that controls a memory device including a plurality of memory blocks, the memory controller comprising:
   a flash translation layer that translates a logical block address received from a host into a physical block address and generates translation information on the translated physical block address; and
   a dummy read controller configured to output, to the memory device, a dummy read command to perform a dummy read operation on a memory block coupled to a target block through a block word line among the plurality of memory blocks after an operation corresponding to a request received from the host is performed on the target block, based on the received request and the translation information,
   wherein the translation information includes information indicating whether the translated physical block address is an address of a memory block unit or an address of a page unit,
   wherein, when the translated physical block address is the address of the page unit, the translation information additionally includes information on a number of pages corresponding to the translated physical block address, and
   wherein, when the request received from the host is a program request, the dummy read controller outputs the dummy read command for the memory block coupled to the target block when the number of pages corresponding to the translated physical block address is determined, based on the translation information, to exceed a reference value.

2. The memory controller of claim 1, wherein, when the request received from the host is an erase request, the dummy read controller outputs the dummy read command for the memory block coupled to the target block after outputting an erase command corresponding to the erase request.

3. The memory controller of claim 1, wherein, when the request received from the host is an erase request, the dummy read controller outputs the dummy read command for the memory block coupled to the target block after checking whether the translated physical block address is the address of the memory block unit based on the translation information.

4. The memory controller of claim 1, wherein, when the request received from the host is a read request, the dummy read controller outputs the dummy read command for the memory block coupled to the target block when the number of pages corresponding to the translated physical block address is determined, based on the translation information, to exceed a reference value.

5. The memory controller of claim 1, wherein the dummy read controller is further configured to generate the dummy read command for instructing that a dummy read voltage be applied to all word lines connected to the memory block coupled to the target block.

6. The memory controller of claim 5, wherein the dummy read controller is further configured to set a level of the dummy read voltage to a level for turning on memory cells respectively connected to all word lines connected to the memory block coupled to the target block.

7. The memory controller of claim 1, wherein the dummy read command instructs that the dummy read operation be performed on the target block.

8. The memory controller of claim 7, wherein the memory device is a multi-plane structure, and the dummy read command is a multi-plane read command.

9. A method of operating a memory controller that controls a memory device including a plurality of memory blocks, the method comprising:
   receiving a request and a logical block address corresponding to the request from a host;
   outputting a command corresponding to the request received from the host and a physical block address obtained by translating the logical block address;
   generating translation information on the translated physical block address; and
   outputting, to the memory device, a dummy read command for a memory block coupled to a target block through a block word line among the plurality of memory blocks after an operation corresponding to the request received from the host is performed on the target block, based on the received request and the translation information,
   wherein the translation information includes information indicating whether the translated physical block address is an address of a memory block unit or an address of a page unit,
   wherein, in response to determining the translated physical block address is the address of the page unit, the translation information additionally includes information on a number of pages corresponding to the translated physical block address, and
   wherein, in response to determining the request received from the host is a program request, outputting the dummy read command for the memory block coupled to the target block in response to determining the number of pages corresponding to the translated physical block address is determined, based on the translation information, to exceed a reference value.

10. The method of claim 9, wherein in outputting the dummy read command, in response to determining the request received from the host is an erase request, the dummy read command is output after outputting an erase command corresponding to the erase request.

11. The method of claim 9, wherein in outputting the dummy read command, in response to determining the request received from the host is an erase request, the dummy read command is output after checking whether the translated physical block address is the address of the memory block unit based on the translation information.

12. The method of claim 9, wherein in outputting the dummy read command, in response to determining the request received from the host is a read request, the dummy read command is output when the number of pages corresponding to the translated physical block address is determined, based on the translation information, to exceed a reference value.

13. The method of claim 9, wherein the dummy read command instructs that a dummy read voltage is be performed on all word lines connected to the memory block coupled to the target block.

14. An operating method of a controller, the operating method comprising:
   controlling a memory device to perform a target operation on a target block or on at least a set number of pages within the target block, the memory device including one or more planes each including blocks each including plural pages; and
   controlling the memory device to perform, after the target operation, a dummy read operation on at least one of the target block and one or more memory blocks coupled to the target block through a block word line within the one or more planes,
   wherein the dummy read operation is performed with a read voltage level to turn on all of memory cells within the one or more memory blocks,
   wherein the translation information includes information indicating whether the translated physical block address is an address of a memory block unit or an address of a page unit,
   wherein, in response to determining the translated physical block address is the address of the page unit, the translation information additionally includes information on a number of pages corresponding to the translated physical block address, and
   wherein, in response to determining the request received from the host is a program request, outputting the dummy read command for the memory block coupled to the target block in response to determining the number of pages corresponding to the translated physical block address is determined, based on the translation information, to exceed a reference value.

* * * * *